United States Patent [19]

Huber et al.

[11] 3,886,530

[45] May 27, 1975

[54] SIGNAL STORAGE DEVICE

[75] Inventors: Ernest E. Huber, Carlisle; Mitchell S. Cohen, Jr., Watertown; Donald O. Smith, Lexington, all of Mass.

[73] Assignee: Massachusetts Institute of Technology, Cambridge, Mass.

[22] Filed: Aug. 17, 1972

[21] Appl. No.: 281,608

Related U.S. Application Data

[63] Continuation of Ser. No. 859,097, Sept. 18, 1969, abandoned.

[52] U.S. Cl. .......... 340/173 CR; 315/8.5; 328/124; 357/23; 357/29; 357/31

[51] Int. Cl. .......... H01j 29/44

[58] Field of Search ..... 317/235 N, 235 B, 235 NA; 328/123, 124; 340/173 CR; 357/23, 29, 31; 315/8.5

[56] References Cited

UNITED STATES PATENTS

| | | | |
|---|---|---|---|
| 2,547,386 | 4/1951 | Gray | 328/123 X |
| 2,901,662 | 8/1959 | Nozick | 328/124 X |
| 2,932,763 | 4/1960 | Williams et al. | 328/123 X |
| 3,046,431 | 7/1962 | Nicholsen | 328/124 X |
| 3,401,294 | 9/1968 | Cricch et al. | 328/123 X |
| 3,497,698 | 2/1970 | Phelan et al. | 317/235 N |
| 3,506,971 | 4/1970 | Sakura | 328/123 X |
| 3,523,208 | 8/1970 | Bodmer et al. | 317/235 NA |
| 3,528,064 | 9/1970 | Everhart | 328/123 X |
| 3,573,753 | 4/1971 | Skelly et al. | 317/235 N |
| 3,623,026 | 11/1971 | Engeler et al. | 317/235 N |
| 3,631,294 | 12/1971 | Hofstein | 317/235 NA |
| 3,644,741 | 2/1972 | Ovshinsky | 317/234 V |
| 3,746,867 | 7/1973 | Phelan et al. | 317/235 N |

*Primary Examiner*—William D. Larkins
*Attorney, Agent, or Firm*—Arthur A. Smith, Jr.; Martin M. Santa

[57] ABSTRACT

A solid-state device consisting of an interface between a semiconductor material and an insulator material, such as in a metal-oxide-semiconductor (MOS) sandwich, serves to store electric charge when an electron beam penetrates the insulator material. The stored charge effects the size of a depletion region in the semiconductor material adjacent the interface and, subsequently, when an electron beam penetrates the depletion region and creates electrons in the semiconductor conduction band and corresponding holes in the semiconductor valence band, the built-in field in the depletion region sweeps the electrons and holes in opposite directions causing a substantial transient electron-hole current, which can be registered by an external current detector. Thus, the same area of the insulator-semiconductor interface (or the MOS sandwich) serves to store an electric charge when conditioned in one manner by an electron beam and produces an output current pulse indicative of the stored charge when conditioned in another manner by an electron beam and the area of the interface which is involved need be no greater than approximately the cross-section area of the electron beam.

46 Claims, 16 Drawing Figures

INVENTORS
ERNEST E. HUBER JR.
MITCHELL S. COHEN
DONALD O. SMITH
BY Robert T. Dunn
ATTORNEY INVENTORS
ERNEST E. HUBER JR.
MITCHELL S. COHEN
DONALD O. SMITH
BY Robert T. Dunn
ATTORNEY

INVENTORS
ERNEST E. HUBER JR.
MITCHELL S. COHEN
DONALD O. SMITH

BY Robert T. Dunn
ATTORNEY

INVENTORS
ERNEST E. HUBER JR.
MITCHELL S. COHEN
DONALD O. SMITH
BY Robert T. Dunn
ATTORNEY

SIGNAL STORAGE DEVICE

The invention herein described was made in the course of work performed under a contract with the Electronic Systems Division, Air Force Systems Command, United States Air Force.

This is a continuation of application Ser. No. 859,097, filed Sept. 18, 1969, now abandoned.

This invention relates to electron-beam-accessed-signal-storage devices and more particularly to a thin sandwich of layers of selected materials on which information is stored at discrete points, to which the electron beam has access to induce storage and to detect stored information.

Heretofore, it has been observed that positive charge can be induced by an electron beam in that part of an insulating layer (such as $SiO_2$ in a MOS sandwich), which is adjacent to an electrode subjected to a bias voltage during bombardment. The charge creation mechanism is probably the following: If a potential is applied across the (MOS) sandwich so that the metal is biased positively, an electron beam penetrating the oxide will create electron-hole pairs as well as excite elctrons from normally filled traps into the conduction band. The holes and electrons in the valence and conduction bands are swept out by the applied field leaving behind a less than normally filled set of trap states after the electron beam is removed.

One investigator suggested that this type of MOS storage device be used in conjunction with an electron beam to store and read out information in either an analog or digital fashion. For this purpose, small MOS transistor devices for storing charge are fabricated over the face of the device with source and drain leads running to each device, and the stored charge is interrogated by sensing changes in the conduction thresholds of these transistors caused by the presence of the stored charge. A clear limitation of devices of this sort is that a separate small structure must be fabricated for each row of bits to be stored and separate leads must be brought out of the device for each row. Moreover, there is one fixed location to which the electron beam must be directed to accomplish the storage and another (adjacent) fixed point to which the electron beam must be directed to detect or read the stored information and these locations are fixed at fabrication. Having a prefabricated storage structure thus imposes severe requirements on steering the beam to a designated location due to nonlinear deflection of the beam in response to the deflection drive signals.

It is one object of the present invention to provide an electron-beam-access-storage device in which these limitations and severe requirements are avoided.

It is another object of the present invention to provide a device for detecting stored electric charge wherein an electron beam is directed to the point where the charge is stored so as to produce an electric current through this point in a direction which is substantially parallel to the direction of the beam, and of a magnitude which is indicative of the stored charge.

It is another object of the present invention to provide a surface in which electric charge can be induced and stored at discrete points when impinged upon by an electron beam, and the stored charge at each point can be detected when thereafter the same or another electron beam is directed to the same point.

It is a further object of the present invention to provide such a surface in which either digital or analog information is stored in a two-dimensional array of points and information can be stored and detected separately at each discrete point in the array without the requirement of separate small structures or leads associated with single or groups of storage points.

In accordance with features of the present invention, an electron beam is directed normal to the surface of a metal-insulator-semiconductor (MOS) sandwich for the writing operation, in which information is put into the device for storage. The electron beam penetrates the metal film into the oxide of the MOS structure, elevating to the conduction band electrons from the valence band and/or from traps in the energy gap of the oxide. The electrons are swept from the oxide by an applied electric field produced by a voltage applied across the MOS, with positive voltage applied to the metal, leaving positive charge centers in the oxide adjacent to the interface between the oxide and the semiconductor. On the other hand, with a negative voltage on the metal, the positive charge is removed from the oxide near the metal-oxide interface. Either condition will remain almost indefinitely with proper selection of the insulator (oxide) and semiconductor. Thus, the position of the stored charge (as well as its magnitude) is determined by the magnitude and sign of the voltage applied during electron bombardment, so that the state of the stored charge in the oxide, which will represent stored information, can be externally controlled in the writing operation. The area of storage is roughly the cross-sectional area of the impinging electron beam.

If the semiconductor is p-type, the presence of positive charge near the oxide-semiconductor interface (metal positive during electron bombardment) tends to make the energy bands of the semiconductor bend down at the interface, thus causing the creation of, or enhancing an existing depletion region in the semiconductor near the oxide-semiconductor interface.

If the semiconductor is n-type, the presence of positive charge near the oxide-semiconductor interface (metal positive during electron bombardment) again tends to make the energy bands of the semiconductor bend down at the interface, but tends to destroy any existing depletion region, and tends to create an accmulation region in the semiconductor.

For either n- or p-type semiconductor materials, the absence of positive charge near the oxide-semiconductor interface (metal negative during electron bombardment) results in no influence on the semiconductor. In addition to the influence of the field from the stored charge in the oxide, an applied bias across the MOS can induce either a depletion or an accumulation space charge region in the semiconductor, depending on the sign of the bias field and the type of the semiconductor, providing that the required bias field is not so high that the dielectric breakdown strength of the oxide is exceeded.

In a reading operation, the MOS sandwich is interrogated in order to detect the information (charge state in the oxide) previously written at a particular point on the surface. The electron beam is directed to the same point at which charge may have been previously stored in the oxide, creating electron-hole pairs upon penetration into the semiconductor. If the semiconductor is p-type, and stored charge in the oxide causes a significant depletion layer in the semiconductor, the electrons and holes created by the beam are swept in opposite directions by the built-in electric field associated with the depletion region, thus giving rise to an externally measureable transient electric current peak. This current peak, denoted $I_s$, can be detected by an external detector coupled to the MOS device, so that by monitoring this current, the state of the charge stored in the oxide can be inferred.

Besides, the above-described electron-hole semiconductor current peak, $I_s$, a continuous beam-induced electron-hole insulator current, $I_i$, can be measured during bombardment under an applied field. The latter current, $I_i$, which is not caused by charge being stored in the oxide, rather, originates in the separation of electrons and holes generated in the oxide and driven by the externally applied bias field.

In the present invention, it is concluded that substantial current amplification occurs when the electron beam is incident on the depletion region in the semiconductor. That is, the $I_s$ current peaks at a value many times greater than the electron-beam current and also many times greater than $I_i$. Since the charge storage area is of the same order of magnitude as the cross-section, area of the electron beam, and it is only in the semiconductor immediately adjacent to this charge storage area that the depletion region is created, it is most important that, during the reading operation, the electron beam be directed to the charge storage area of interest, and not significantly overlap or extend to adjacent areas of charge storage in the MOS sanwich.

Other features and objects of the present invention will be apparent from the following specific description taken in conjunction with the figures, where FIGS. 1 to 5 are symbolic energy band diagrams representing a metal-insulator-semiconductor sandwich in which the semiconductor is p-type, as an aid to understanding the operation. More particularly, in the figures:

Figures 1, 2, 3, 4:
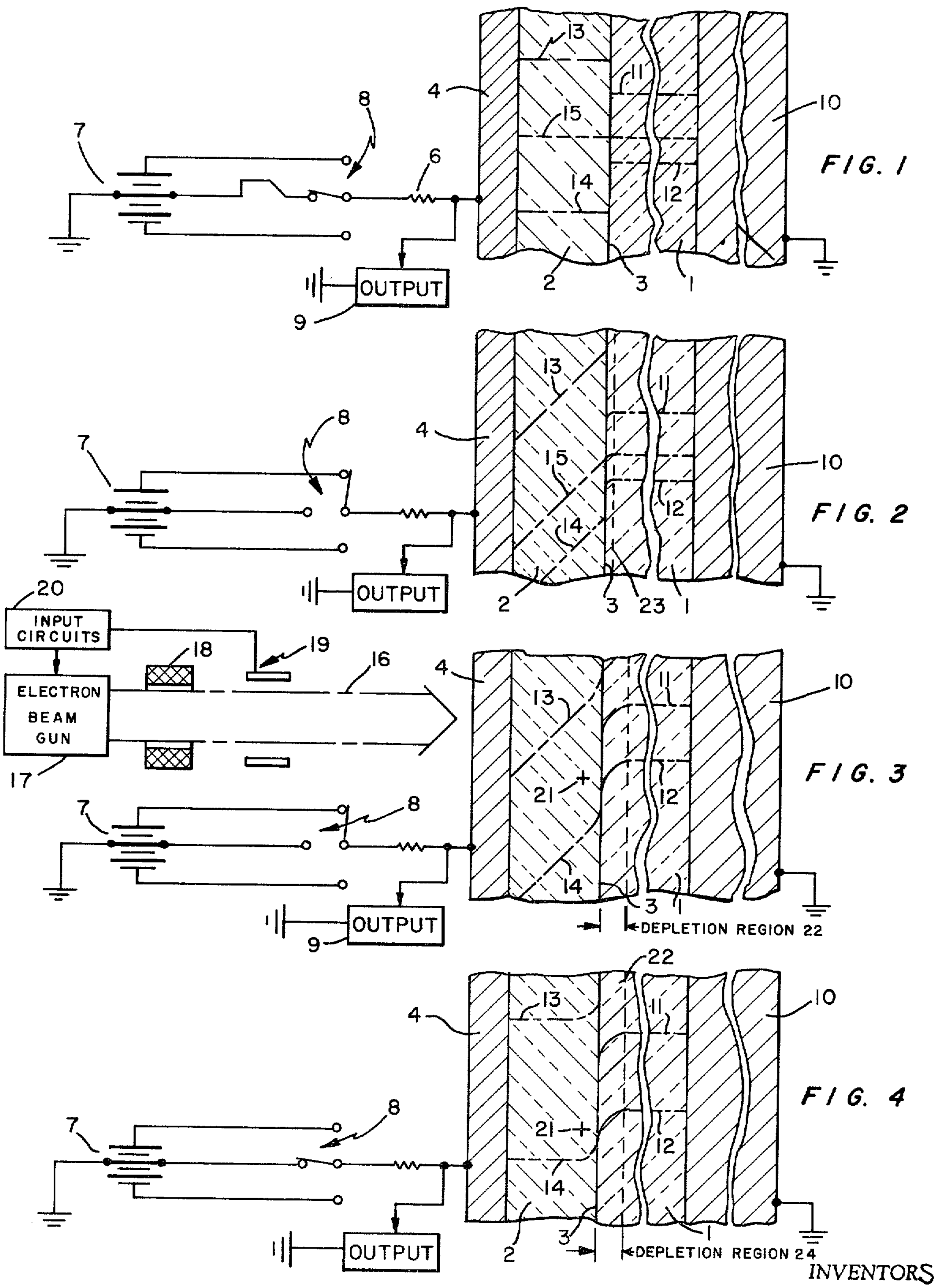
FIG. 1 illustrates the layers of materials and the relative energy levels through the semiconductor material in the binary zero state and with no external voltage applied and no positive charge stored in the oxide adjacent the interface.
FIG. 2 illustrates the bands when a bias potential is applied across the sandwich with a polarity such that the metal film is positive with respect to the semiconductor.
FIG. 3 illustrates the bands in the materials when an electron beam penetrates the insulator layer, while the positive voltage is applied.
FIG. 4 illustrates the relative band levels in the materials in the binary one state or while storing charge at the interface, and with no external voltage applied across the device.

Referring first to FIGS. 1 through 5, there is shown in symbolic form a sandwich of layers of materials and energy bands which define the principal storage element of the present invention. In FIG. 1, the layers include a semiconductor substrate 1 contiguous with the insulator material (oxide) 2, the interface between these materials being defined by line 3. A conductive film 4 extends over and is contiguous with the insulator layer 2. A good electrical contact is made between the conductive layer 4 and an impedance 6, which is coupled to a voltage source 7 via a switch 8 and also couples to an output 9, which is a current-detecting device. A conductive layer 10 forms an ohmic contact with the other face of the semiconductor substrate, and is electrically grounded. The binary zero state is defined as no charge stored in layer 2 next to the interface 3. With no external voltage applied across the film sandwich so that no electric field is produced between the conductive film 4 and the conductive layer 10, the energy bands in the semiconductor may be represented by the lines 11 and 12. Line 11 represents the bottom of the conduction band and line 12 represents the top of the valence band. Similarly, lines 13 and 14 represent the bottom of the conduction and the top of the valence bands in the insulator material 2. In this condition, when the semiconductor 1 is p-type, the Fermi level through the semiconductor and insulator is represented by the dashed line 15. In general, some band bending in the semiconductor can be anticipated because of the presence of surface states at the insulator-semiconductor interface 3, but since this bending can be made insignificant compared with that caused by the presence of stored charge in the insulator near interface 3, it is ignored in FIG. 1. The band structure model shown in FIG. 1 can represent any insulator material 2 and any p-type semiconductor material 1.

When a positive voltage is applied to the conductive film 4 by actuating the switch 8 to the position shown in FIG. 2, the presumed conduction and valence band edges 13 and 14 in the insulator layer 2 slope as shown in the figure. Some of the voltage drop between the conductive film 4 and the conductive layer 10 occurs inside the semiconductor 1, near the insulator-semiconductor interface 3, thereby causing bending of the bands in the semiconductor near this interface and producing the shallow depletion region 23.

FIG. 3 illustrates the same condition as shown in FIG. 2, with a positive potential applied to the conductive film 4, but where now means are provided for producing and directing an electron beam 16, herein called the write beam through the conductive film 4 and into the insulator layer 2. This means may include, for example, an electron beam gun 16, and electron lens 18, a set of deflection plates 19, and input circuits 20 for energizing the gun and deflection plates and thereby controlling both the intensity and position of the write beam 16.

The energy of the electron beam 16 is sufficient so that it penetrates the conductive film 4 and into the insulator layer 2, producing stored charge 21 in the insulator layer 2 in the vicinity of the interface 3. The electron beam excites electrons in the insulator into the conduction band 13, either from the balance band 14 or from traps in the forbidden region between these bands and these excited electrons are swept out from the insulator layer 2 by the electric field bounded between the film 4 and the conductive layer 10. It is presumed that this electron generation in the insulator layer 2, where the beam penetrates, is uniform and that most of the insulator layer where the beam penetrates, as well as elsewhere, remains electrically neutral and has uniform conductivity. However, since no electrons flow cross the interface 3, a positive space charge must build up in the insulator material at the interface. Hence, the stored charge 21 is presumed to lie in the insulator material very close to the interface 3.

This proximity of the stored charge 21 to the interface between the insulator and the semiconductor has a very strong effect on the energy bands in the semiconductor immediately adjacent the interface. It causes an even sharper and deeper bending of the bands than with the positive bias alone (FIG. 2) and may even result in an inversion layer at the interface in addition to the depletion layer. If the semiconductor material is p-type, a depletion region 22 is associated with the band bending. An accumulation layer would be produced if the material were n-type.

The conduction and valence band edges 13 and 14 in the insulator material 2 are also altered by the stored charge 21. As shown in FIG. 3, these bands bend upward in the vicinity of the stored charge adjacent to the interface 3 and slope uniformly throughout the rest of the insulator layer to the conductive film 4. This uniform slope is due to the applied positive voltage.

Thereafter, when the conductive film 4 and conductive layer 10 are at the same voltage so that no external field is imposed on the sandwich, the stored charge 21 remains and the bands in the semiconductor and the bands in the insulator and depletion region 24, remains as shown in FIG. 4. The depletion regions 24 and 22 are distinguished by the effects of the applied voltage. In other words, even though the switch 8 is in the same position as in FIG. 1, charge is stored in the sandwich and this storage is manifest in the band bending shown in FIG. 4. This state is designated herein the binary one storage state and as already mentioned, the state shown in FIG. 1 is designated the binary zero state. The sandwich is capable of operation to change from binary one to binary zero and to read or detect binary one and binary zero storage. The change from binary one to binary zero is achieved by bombarding with electrons (beam) while a negative voltage is applied across the sandwich, placing the sandwich in the condition shown in FIG. 1 after removal of the bias voltage. It is a principal feature in the present invention to make use of these effects of the stored charge on the semiconductor energy bands to detect the presence of the stored charge. The condition shown in FIG. 4 (no external field applied) whereby the bands in the semiconductor are sharply bent at the interface, results in the formation of the depletion region 24 in the semiconductor adjacent to the interface and provides a built-in electric field in the semiconductor adjacent the interface, which is ever ready to sweep out in opposite directions, holes and electrons should they be produced in the depletion region of the semiconductor. Furthermore, this effect of the stored charge remains almost indefinitely, depending upon the temperature and depth of traps containing the stored charge. Quite clearly, a variety of semiconductor and insulator materials can be selected so that the storage conditions represented in FIG. 4 remain at useful levels for relatively long periods of time. In addition to Si and $SiO_2$, some other suitable semiconductor and insulator materials which may be suitable are listed in the table below.

| Semiconductor | Insulator |
|---|---|
| InSb | $Al_2O_3$ |
| InAs | SiN |
| GaAs | AlN |
| Ge | MgO |
| | $SiN$-$SiO_2$ (double layer) |

In the case where a double layer of $SiN$–$SiO_2$ is the insulator material and bombarded by the electron beam to store charge, the stored charge can be negative.

The depletion region 23, shown in FIG. 2, is formed merely by application of the bias voltage across the sandwich without exposure to the electron beam. However, such a depletion region would disapper upon removal of the bias and the band structure would revert to the state illustrated in FIG. 1.

The stored information is detected or read by again directing an electron beam to the sandwich of materials so that it penetrates the conductive film 4, the insulator layer 2, and into the depletion region 24 of the semiconductor material, immediately adjacent the stored charge 21. The condition is represented by the diagram in FIG. 5. Within the depletion region, the electrons which are excited by the read electron beam 25 into the conduction band 11 and the corresponding holes created in the valence band 12 of the semiconductor are swept in opposite directions by the built-in electric field in the depletion region, thereby creating a transient electron-hole current of substantial magnitude which is detected in the output 9. During exposure to the read beam 25, a potential may be applied across the sandwich between conductive films 4 and 10, in order to influence the depletion region and hence the efficiency of electron-hole collection from this region, so that his efficiency attains an appropriate value.

Consider next the situation in which positive charge had not been induced in the insulator near interface 3 during the writing operation. This state, designated herein as the binary zero storage state, is represented by FIG. 1. It is induced by application of a negative bias voltage during bombardment by the write beam. In that case, after removal of the bias, the band structure would be as in FIG. 1, and there would be a negligible depletion layer. It is evident that because of the absence of a built-in field, the efficiency of electron-hole current collection during the reading operation from such a region would be very low compared with that from a region in which positive charge had been written into the insulator near the interface 3. Thus, with p-type semiconductor in the reading operation, a large transient electron-hole current is an indication of the presence of a stored binary one, while a small electron-hole current signifies the presence of a stored binary zero. A digital information storage and retrieval system has thus been attained.

If the semiconductor material 1 in FIGS. 1 to 5 were n-type rather than p-type, then the band bending shown above in FIG. 4 will be the same; however, the Fermi level is located nearer the conduction band. This results in the formation of an accumulation region rather than a depletion region in the semiconductor adjacent to the interface for positive bias or positive charge storage. Therefore, reading is accomplished while applying a negative bias to the film 4, rather than a positive bias. Since an electron-hole current can be registered only in the presence of a depletion region, the binary one and binary zero stored must be distinguished by reading while a negative bias is applied to film 4 with n-type material. In this case, a stored binary zero (no charge stored) is represented by a large transient current pulse output and stored binary one (positive charge stored) is represented by a relatively small current pulse output.

Analog information storage and retrieval is also possible in principle with this system, if the magnitude of the electron-hole current is carefully monitored as an indication of the precise amount of charge stored near the insulator-semiconductor interface 3.

The above-described sequence of operation, illustrated by FIGS. 1 through 5, is summed up as follows: With a positive bias applied to the conductive film 4, positive charge 21 is stored in the insulator layer 2 near the insulator-semiconductor interface 3 by bombardment with the write electron beam 16 on a small spot of the storage element, the write beam being of sufficient energy as to penetrate the conductive film 4 to the insulator layer 2. This operation causes storage of a binary one in the storage element where the write beam 16 impinges. Alternatively, if a negative bias is applied to the conductive film 4 during the writing operation, any positive charge which had been stored near the insulator-semiconductor interface 3 is removed, thereby causing storage of a binary zero in the storage element where the write beam 16 impinges. The position of the bit of information is thus defined by the position of the write beam, and the state of the bit is defined by the condition of bias during writing. This is the case whether the semiconductor is p-type or n-type. Subsequently, the stored information at the spot is interrogated by the read beam 25, which is directed to the same spot on the element in which the information storage has occurred, the spot being selected by suitable control of the electron optical system. A suitable bias is applied during the reading operation, which is zero or positive for p-type material or zero or negative for n-type material, and the electron-hole current is monitored by the output current detector 9. In the case of p-type semiconductor material, the detector will show a large transient current pulse if a binary one has been stored, but a comparatively small pulse if a binary zero has been stored. In the case of n-type semiconductor material, the detector will show a small current pulse for a binary one and a larger transient current pulse for a binary zero.

Figure 5:
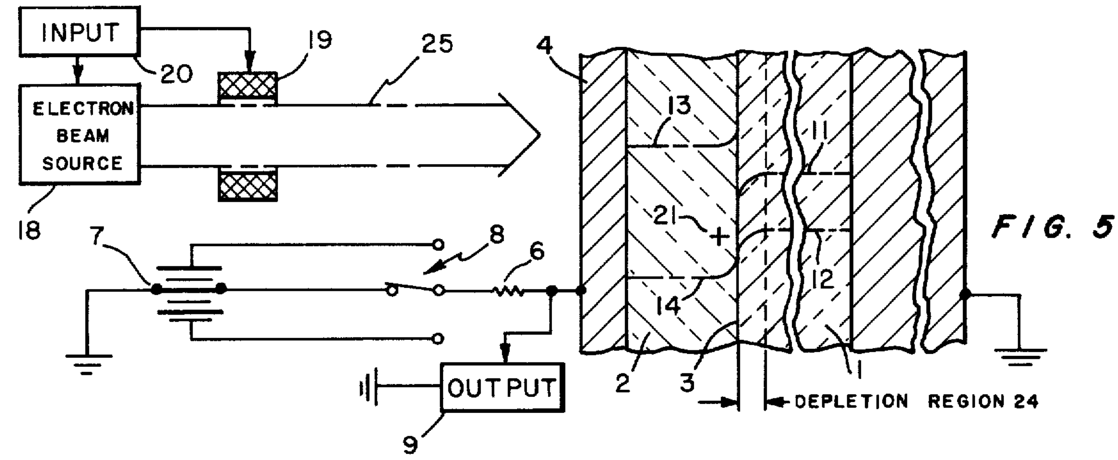
FIG. 5 illustrates the relative band levels when no voltage is applied and an electron beam penetrates to the depletion region in the semiconductor, producing an output current indicative of the binary one state or the stored charge.

The magnitude of the bias voltage applied to the conductive film 4 during the reading operation, illustrated in FIG. 5, must be chosen with care. When p-type semiconductor material is used, a positive bias will tend to cause a binary one to be written during this operation, while a negative bias will tend to store a binary zero, even though a binary one has been stored. If the magnitude of the bias voltage applied to the film 4 during the writing operation, illustrated in FIG. 3, is relatively high and the write beam current is relatively high, and the read beam bias is relatively low and read beam current is relatively low, then these problems will be minimized. However, in some applications, periodic rewriting of information may be required.

Figure 16:
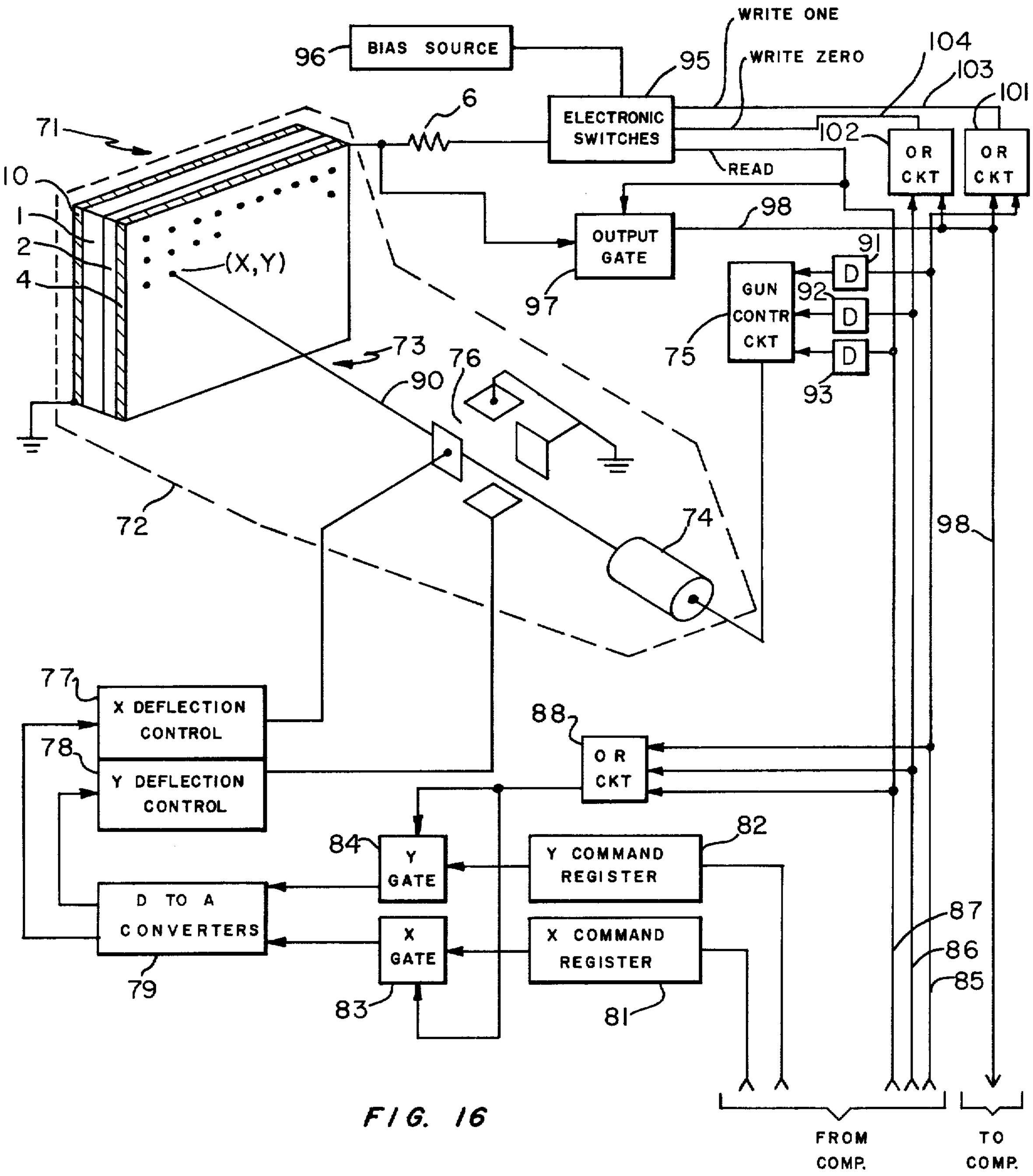
FIG. 16 is a block diagram of a system for random access storage including an MOS sandwich which provides an array of storage points.

FIG. 16 illustrates a specific embodiment of the present invention employing an Si–$SiO_2$, MOS device 30. This device is made starting with a chip of single crystal p-type Si 31 of resistivity approximately 1.0 ohm-centimeter, having less than 100 dislocations per centimeter$^2$ and about 2.5 centimeters in diameter and 0.2 millimeters thick. A mirror finish is provided on the (100) face. The chip is placed in a quartz holder and cleaned and etched in hydrofluoric acid, buffered with ammonium fluoride, then cleaned and etched again with hydrofluoric acid and heated to about 1,100°C in the presence of dry oxygen, producing the layer 32 of $SiO_2$ on the surfaces of the chip about 1,000 angstroms thick. The chip is then broken into square elements about 8 millimeters on a side and an aluminum film 34, 500 anstroms thick is vacuum deposited on the oxide layer 32. A gold land 35 is deposited on the aluminum film for making a pressure electrical contact to lead 36. An ohmic contact is formed at the opposite face of the Si to the electrically conductive layer 37.

Figure 7:
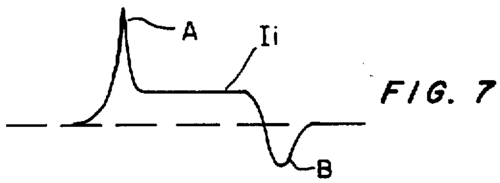
FIGS. 7 and 8 are waveform figures illustrating the shape and relative amplitudes of the output signal produced when reading a binary one and binary zero, respectively.
Figures 6, 8:
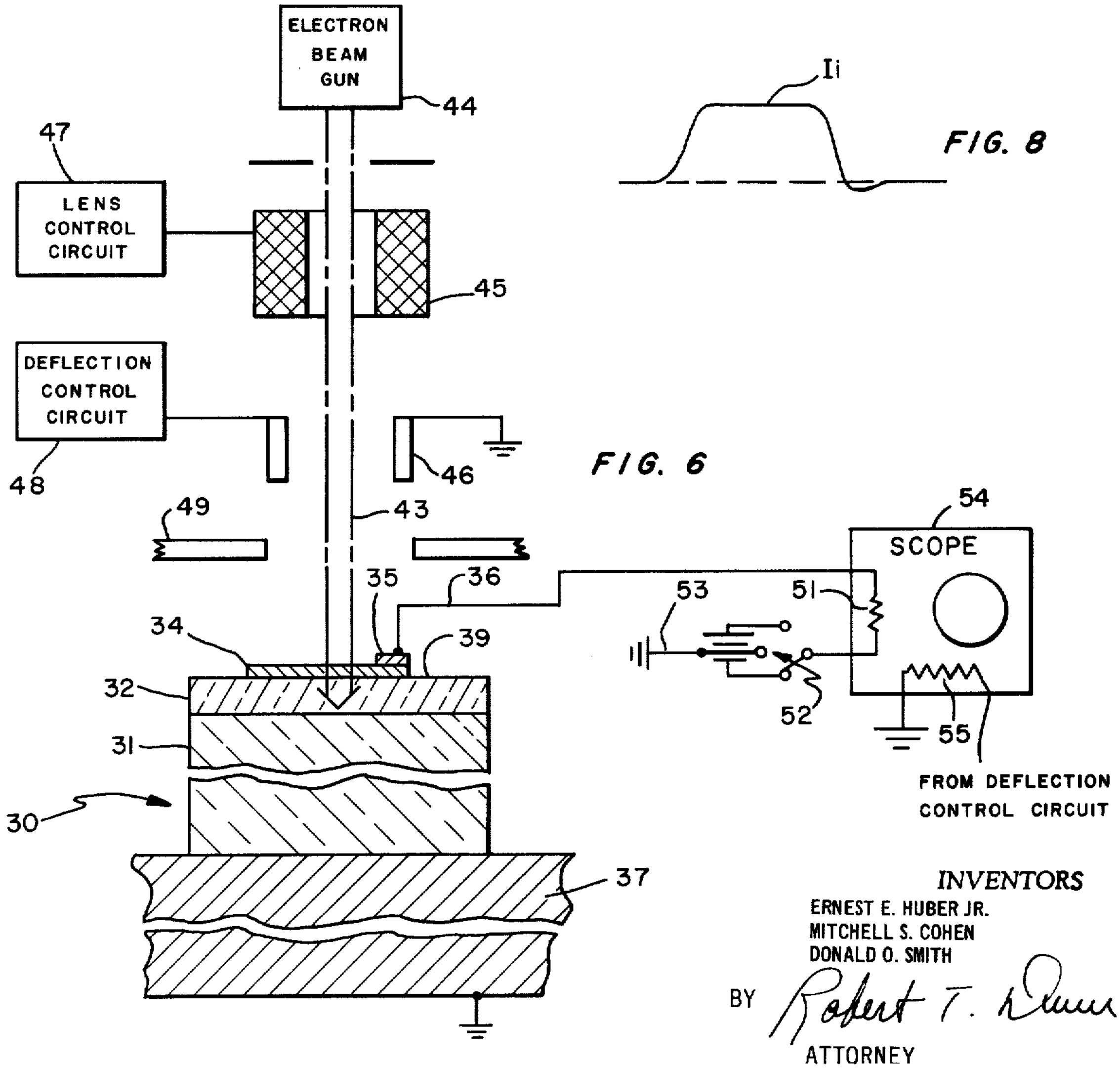
FIG. 6 is a schematic and symbolic representation of apparatus employed in conjunction with a simple embodiment of the present invention to determine writing and reading effects and examine the output signal.

In a particular operation described herein, an electron beam 43 of energy about 5 kv and current density about $2.5 \times 10^{-3}$ amps/cm$^2$ from a suitable gun 44 is focused to a 20 to 30 micron diameter spot size by a lens 45, followed by deflection plates 46 in front of the MOS element 30. Suitable control circuits 47 and 48 are provided for energizing the lens and the deflection coil. An aperture 49 limits the area of the MOS element that can be scanned by the electron beam. A bias voltage is applied to the film 34 via the impedance 51 and the switch 52, coupled to the voltage source 53, and the voltage across the impedance 51 is fed to the Y-axis terminal of the oscilloscope 54. The X-axis of the oscilloscope is controlled by the same signal which energizes the deflection plate 46 and so the oscilloscope trace is a representation of output current conducted by the MOS element as the electron beam sweeps across the face of the element. FIGS. 7 and 8 are waveforms illustrating this trace for binary one and binary zero read operation respectively. Points A and B of the trace, shown in FIG. 7 correspond respectively to the emergence and disappearance of the beam as it scans past the aperture 49. A binary one is written when the film 34 is biased positive and positive charge is induced by the beam in the oxide and a depletion region is formed in silicon material 31, just as already described above with reference to FIGS. 1 to 5. Generally, if a field is applied across an insulator while bombarded by an electron beam, an electron-hole current, $I_i$, will be induced and registered in a suitable external circuit. Such a current is also observed here when the MOS element is bombarded. The current level lying between the peaks A and B in FIG. 7 is principally due to $I_i$. The peak at A in FIG. 7 is due to the high transient electron-hole current from the depletion region in the semiconductor and is designated $I_s$.

Where on the other hand no charge is stored in the oxide adjacent the interface and with positive bias applied to the MOS element, the first scan produces an output pulse as illustrated by the waveform in FIG. 8. Since there is no positive charge stored in the oxide at the oxide-semiconductor interface, helping the applied bias to create a depletion region, there is a relatively higher beam induced current $I_i$, but no $I_s$. The peak A in FIG. 7 is due to the high transient electron-hole current from the depletion region of the semiconductor and is identified herein as $I_s$. It is clearly not some other charging artifact, because it can be made to appear and disappear with the bias and with the stored charge and by the fact that it represents a current flow through the output resistor 51, which is approximately 80 times the electron beam current. Even larger current amplifications are observed for larger beam energies. The negative peak B in FIG. 7 is due to a minority carrier recombination and is also transient. The current level between peaks A and B is $I_i$. The current $I_i$ in FIG. 7 is lower than in FIG. 8 because of the reduced field across the oxide, caused by the stored charge.

Figure 9:
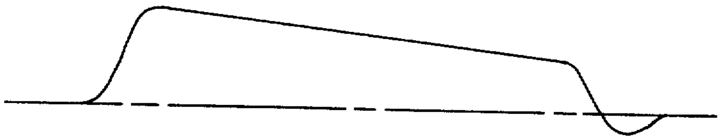
FIG. 9 is a waveform illustrating the output signal from the simple embodiment when the electron beam sweeps across the areas where no positive charge has been previously stored near the oxide-semiconductor interface, for comparison with the waveform in FIG. 10.
Figure 10:
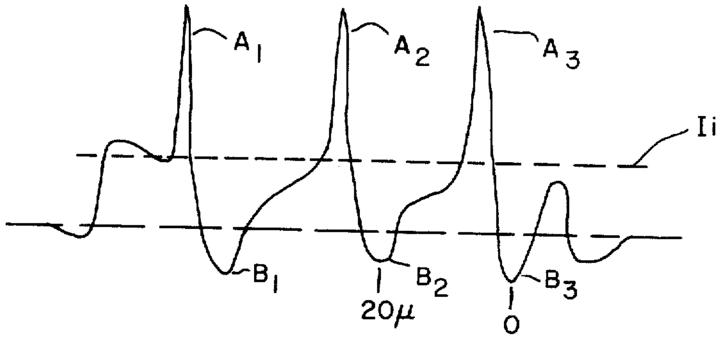
FIG. 10 is a waveform figure illustrating the output signal with the simple embodiment when the electron beam sweeps transversely across three separate and distinct stripes in which positive charge has been previously stored near the oxide-semiconductor interface.

The localized nature of response of the MOS element is further demonstrated by placing the element in the store binary zero state (represented by FIG. 1). That is, the whole exposed area of the element is scanned while a negative bias is applied, so that thereafter the first scan with positive bias produces an output waveform as shown in FIG. 9. Then a number of separate spaced parallel lines are scanned across the face of the element, while the bias is positive and so charge storage along separate spaced parallel lines across the face of the device is accomplished. Then, with zero bias the element is scanned once perpendicular to the lines thus formed, producing the output signal having waveform as represented in FIG. 10. The physical width of each line is not as wide as appears from the scope trace due to electron-hole recombination time. The scope trace in FIG. 10 reveals three peak responses $A_1$, $A_2$ and $A_3$, similar to the peak A in FIG. 7 and three similar negative peaks $B_1$, $B_2$ and $B_3$, similar to peak B in FIG. 7, all superimposed on a continuous $I_i$. Each of the three positive peaks has a width of a few microseconds and the dwell time of the beam on each of the lines it crosses to produce the output waveform shown in FIG. 10 is on the order of about 1 microsecond.

The MOS element described herein and particularly the $SI–SiO_2$ form of the device with p-type Si serves to store electric charge which can represent a binary bit and will retain the stored charge. The bit is stored in an area of the MOS element which is about the same size as the cross-section of the electron beam which induces storage. The stored bit can be detected simply by noting the response of the MOS element to the electron beam directed again to the same spot. If charge has been stored at the spot indicating storage of a binary one bit, detection consists of scanning the same spot with the electron beam and noting either of two effects. The first effect is the transient electron-hole current from the depletion region, $I_s$, and the other is the insulator current, $I_i$. Clearly, the electron hole current, $I_s$, which produces the peak at A in FIG. 7 is the more significant and outstanding effect and monitoring this peak to see if a binary one or binary zero has been written is effective.

The current $I_i$ can also be monitored to determine if a binary one or binary zero has been written. If the output during reading operation were, for example, gated to eliminate the transient peaks A and B, the resulting signal level would still indicate binary one or binary zero. Without the transient peaks, the distinction between a binary one and a binary zero can be lost. The relatively higher level would indicate binary zero.

Ideally, with the same MOS element, the read beam energy may be higher (about 20 to 30 keV) and the cross section of the read beam somewhat smaller than the cross section of the write beam. The read beam current or current density should be chosen with care because a high current density will result in a large peak signal output easily detected, but will also, at least partially, erase the stored charge. On the other hand, the read beam of relatively low current density causing negligible erasure will produce only a small peak more difficult to detect. Clearly, the current or current density of the read beam that is selected will depend upon the use intended. If a sandwich of layers corresponding to the layers of the MOS element shown in FIG. 6 is provided in a cathode ray tube, so that information such as binary bit storage is accomplished over a vast array of storage points, and access time, write time and read time are maintained minimum, then it would be preferred to employ a read beam and a write beam (the same source may be used for both) of high current density and switching circuits would be needed to follow each read operation with a re-write operation to reinstate the binary bit that is read, because the reading would at least partially erase the stored bit. On the other hand, if the requirements for access, read and write times are less severe, the read beam at least can be of sufficiently low current density that re-write would not be required after each reading, or might only be required after many cycles of reading.

Figure 11:
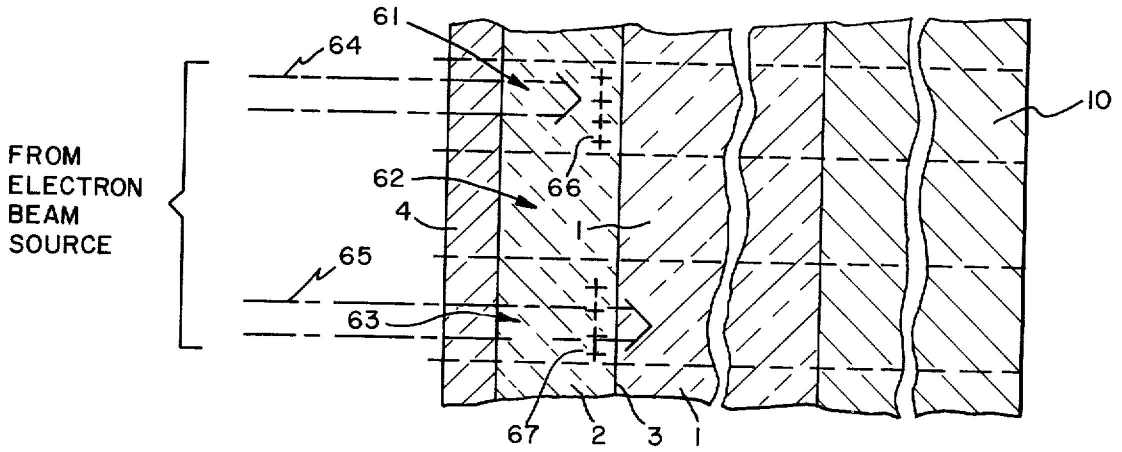
FIG. 11 is a symbolic cross section of a sandwich formed of layers, corresponding to the layers in the simple embodiment, which provides an array of distinct storage areas or points.

FIG. 11 is a diagram showing a cross section of part of such a MOS structure including p-type Si on which three randomly chosen adjacent areas of storage are identified rather than only one, as in FIGS. 1 to 5. The three areas of storage are 61, 62 and 63. The write beam 64 and the read beam 65, which might originate from the same gun at different times, or could originate from different guns which are synchronized, are shown directed to storage areas 61 and 63 respectively. The write beam 64 produces the stored charge 66 in the area 61 when film 4 is biased positive, and need be of no greater energy than necessary to penetrate the metal film 4 into the oxide layer 2. Thus, area 61 stores a binary one. Area 62 stores a binary zero, which is accomplished by directing the write beam to area 62, while negative bias is applied to the film 4. The read beam 65 interrogates the storage area 63, containing stored charge 67, and is of sufficient energy to penetrate through the insulator and into the semiconductor 1. The effects of the write beam and the read beam have already been described above with respect to FIGS. 1 to 5.

The write beam, when directed to the storage area 61, while a relatively large positive voltage is applied to the metal film 4 induces stored charge 66 in the area. Alternately, when the read beam 65 is directed to area 63, while the MOS film is biased zero, or slightly positive, the MOS film will produce an output signal of waveform similar to that in FIG. 7, containing a peak A which is detected to indicate that a binary one bit is stored at 63. On the other hand, if the read beam 65 were directed to storage area 62, in which no charge is stored, indicating the presence of a binary zero bit, the output would appear as shown in waveform in FIG. 8 and some amount of charge storage would occur. Thereafter, it might be necessary to rewrite binary zero in area 62 by redirecting the write beam 64 to area 62, while a negative bias is applied to the MOS film, thereby erasing any stored charge induced by the read beam 65 in that area. Whether it would be necessary to reinstate binary zero bit storage after each reading will depend upon the current density of the read beam 65. If the current density were very low, meaning slower read-out time, then the amount of charge storage induced by the read beam in the area might be negligible and rewriting a zero is area 62 might not be required, except after many readings of that area.

The change in storage at a storage point from stored binary one to stored binary zero is accomplished employing the procedure for storing binary zero; that is, the write beam is directed to the area while negative bias is applied. This removes the charge stored at the $Si$–$SiO_2$ interface. When the change desired is from stored binary zero to stored binary one, the beam is directed to the spot while a positive voltage is applied.

The time required for re-write can also be minimized by proper choice of the read bias. For example, if the read bias is positive and as great as the bias for writing binary one, then there will be no destruction of the stored binary one, but complete destruction of stored binary zero and necessitate re-write of only stored binary zero. Since binary zero can be written faster than binary one, this can result in a faster system.

Figure 12:
FIGS. 12 and 13 are waveforms showing output signals from a suitably biased p-type MOS structure when the read beam is directed to areas of stored binary zero and binary one, respectively.
Figure 13:
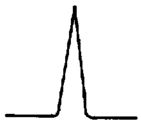
Figure 14:
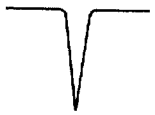
FIGS. 14 and 15 are waveforms showing output signals from a suitably biased n-type MOS structure when the read beam is directed to areas of stored binary zero and binary one respectively.
Figure 15:

FIGS. 12 and 13 represent output signal waveforms produced in an output circuit coupled to the p-type semiconductor MOS structure shown in FIG. 11 and which has been gated so that only the $I_s$ (peaks) are observed. When the read beam 65 is directed to storage area 62, the output is as shown in FIG. 12. When directed to areas 61 or 63, the output is as in FIG. 13. The small peak in FIG. 12 is due to some $I_i$ which is not completely eliminated by the gating. Thus, the stored binary one and zero can be readily distinguished by the magnitude of the peak on the output. If the MOS structure is formed with n-type semiconductor, then operation to store binary one and binary zero is the same as with p-type, however, read operation is different. With n-type semiconductor, read must be accomplished while a negative bias is applied to the film 4. In this case, the output when the read beam is directed to area 62 (which stores binary zero) appears as in FIG. 14, and when directed to area 61 or 63 (which store binary one) appears as in FIG. 15. Again, the stored binary one or binary zero can be easily distinguished by the magnitude of the peak.

In view of the tendency to erase both binary one and zero bit storage each time the bit is read, it is advised that a system employing the MOS film, such as described herein, for random access storage incorporate a system for rewriting each bit as it is read or rewriting each bit periodically, after so many readings. A general system of this sort is used in FIG. 16. The system includes a cathode tube 71, including an envelope 72, enclosing a target surface 73 which is a MOS sandwich, such as described herein. The MOS sandwich includes from the beam side, conductive film 4, insulator film 2, semiconductor layer 1 and conductive layer 10. The MOS sandwich provides an array of storage points such as storage areas 61 to 63, shown in FIG. 13. The array may be an arrangement in rows and columns, as shown in the figure and is entirely determined by the electron beam 90. The other end of the envelope contains electron gun 74 containing beam accelerators energized by gun control circuit 75 to control both electron energy and beam current, as necessary, to energize the gun to read and write zero and one bits of information on the MOS film, just as described above with reference to FIG. 11.

The beam is positioned by the deflection plates 76, which are energized by the X and Y deflection control circuits 77 and 78, respectively. These circuits are in turn controlled by the output of digital to analog (D to A) converters 79, which convert the outputs from the X and Y command registers 81 and 82 to analog signals for controlling the circuits 77 and 78. Gates 83 and 84 feed the outputs from the registers 81 and 82, respectively, to the converters 79 and are controlled by either the write one, write zero, or read signals, whch are fed to the system via lines 85 to 87, respectively, from a computer, which is not shown. The energizing signals in these lines from the computer are combined by OR circuit 88, so that any one of them will control gates 83 and 84 and feed the output from the registers 81 and 82 to the converters 79, to the X and Y control circuits 77 and 78. Thus, the electron beam 90 will be deflected to the $x$ and $y$ coordinates of points such as $x,y$ on the face of the MOS sandwich 73. Therefter, the same signal in one of line 85 to 87 from the computer energizes the gun control 75, producing a beam of predetermined energy and current which is directed to the point $x,y$ in the MOS surface. Delays 91 to 93 are provided in these lines to allow sufficient time for the deflection plates 76 to be energized to insure that the beam 90 will strike only the point $x,y$. Meanwhile, the same signals from the computer control the switches 95. The read signal in line 87 is fed directly to the switches 95 and the write one and write zero signals in lines 85 and 86 are fed through OR circuits 101 and 102 to the write one and write zero lines 103 and 104 respectively which control switches 95. The switches 95 apply the proper bias from source 96 through the output impedance 6 to the conductive film 4 on the MOS sandwich. The various biases applied to write binary one, write binary zero, and read, have been described hereinabove. A write binary one command produces a relatively large positive bias on the film 4, while a write zero command produces a relatively large negative bias. A command to read produces ground or a slight positive bias.

When the command is to read and the read bias is applied to the film 4 while the beam is directed to the designated storage spot, such as $x,y$, output gate 97 is energized, so that the voltage across the output impedance 6 is fed to the computer. If the read bit is a binary one, line 98 from the output gate 97 will feed a sharp positive peak signal to the computer. On the other hand, if the read bit is a binary zero, a relatively low level positive signal will be fed from line 98 to the computer.

Rewriting the read bit to rectify the erasure which occurs when the bit is read can be accomplished by applying after each reading of the bit, such as bit *x,y*, while the electron beam is still energized and directed to the point *x,y*, a suitable bias on the MOS sandwich to either write one or write zero back into the spot. To facilitate this, the output from the gate 97 is fed to OR circuits 101 and 102 which energize the write one and write zero lines 103 and 104 into the switches 95, so that one of these lines in energized just as from the computer, but depending on the read signal in the output of gate 97. If the read signal is a peak signifying binary one, then the signal in line 103 is effective to control the switches. Otherwise, the signal in line 104 representing a read binary zero is effective to control the switches 95.

The OR circuit 102 differs from OR circuit 104 in that 102 is enabled when output gate 97 has an output implying a 0 while 101 is enabled when 97 has an output implying a 1. This operation is clear from the description and further details of the circuits involved as part of OR circuits 102 and 104 and gate 97 are apparent to those skilled in the art.

The system in FIG. 16 illustrates but one use of the invented structure described herein in various forms for random access storage of binary information, where access to the information is obtained with an electron beam that designates the storage points and writes in and reads out the stored information. Quite clearly, the same MOS sandwich could be employed in a storage system where access is not random, and thus, provide a storage system of more limited scope than the one shown in FIG. 16. Furthermore, as already mentioned, depending upon the requirements of the system, it might be possible to eliminate the necessity of writing in information each time it is read, due to the erasure which occurs during the read phase. However, such a system would suffer speed limitations as already discussed.

The storage phenomena involved in the present invention and described particularly in the discussion of FIGS. 1 to 5 involves some charge storage phenomena which have been known and observed by others. The principal advancement in the present invention lies in the various structures, techniques and methods described employing both p- and n-type semiconductor materials for storing and detecting the stored information such as binary information. These and other features are set forth in the accompanying claims.

What is claimed is:

1. A device for detecting stored information represented by stored electrical charge comprising, an interface formed between a semiconductor material and an insulator material, means for reversibly changing the electric charge stored in a given area of said insulator material adjacent the interface, in representation of said information, said electric charge change being sufficient to produce a change in a space charge region in the semiconductor material in registration with the given area in representation of said information, signal detecting means coupled to the device for detecting current flow across the interface, and means for producing and directing an electron beam into said space charge region in the semiconductor producing a transient current signal in the detecting means representative of said stored information.

2. A device as in claim 1 and in which, the semiconductor material is p-type, said stored electric charge is changed positive producing a depletion space charge region in the semiconductor material adjacent the interface and the electron beam is directed into the depletion region exciting electrons into the semiconductor conduction band and producing holes in the semiconductor valence band both of which are swept from the region by the electric field associated with the depletion region producing the transient current signal.

3. A device as in claim 1 and in which, means are provided for producing a controlled electric field in said materials directed across the interface and the controlled field is synchronized with the electron beam.

4. A device as in claim 1 and in which, the detecting means detects a transient current peak produced when simultaneously the beam is directed to the depletion region and a controlled electric field is produced across the interface.

5. A device as in claim 4 and in which, the current peak is substantially greater than the simultaneous electron beam current.

6. A device as in claim 3 and in which, the stored electric charge is positive, the semiconductor material is p-type, and the controlled electric field direction is from the insulator toward the semiconductor.

7. A device as in claim 1 and in which, the insulator material is formed in a layer on a surface of a body of the semiconductor material and a layer of conductive material is formed on the insulator layer, the thickness of the insulator layer being at least determinative of the rate of response of the device.

8. A device as in claim 7 and in which, the semiconductor material is p-type Si.

9. A device as in claim 8 and in which, the insulator material is $SiO_2$.

10. A device as in claim 9 and in which the $SiO_2$ thickness is about 1000A°, the conductive material is Al of thickness about 500A°, and the electron beam is of sufficient energy to penetrate the Al and $SiO_2$ layers and into the Si.

11. A device for storing electric signals and then detecting the stored signals in response to an incident electron beam comprising, an interface formed between a semiconductive material and an insulator material, means for producing a controlled electric field in said materials across said interface, means for producing and directing an electron beam into a given area of said materials during one interval at the same time said electric field is produced of suitable magnitude and direction to cause a reversible change in the electrical charge stored in said insulator material adjacent the interface representation of said information, signal detecting means coupled to said device, and means for directing said electron beam into the same given area of said materials during another interval producing a transient signal in said detecting means representative of said stored information.

12. A device as in claim 11 and in which,
said stored electric charge modifies a depletion region in the semiconductor material adjacent to the interface and
the electron beam during the other interval penetrates into the depletion region creating electron-hole pairs which are separated and swept from the region by the electric field associated with the depletion region producing the transient signal as a transient current pulse peak which is conducted to the signal detecting means.

13. A device as in claim 12 and in which,
the current peak is substantially greater than the simultaneous electron beam current.

14. A device as in claim 11 and in which,
the stored electric charge is positive,
the semiconductor material is p-type, and
the controlled electric field direction is from the insulator toward the semiconductor.

15. A device as in claim 11 and in which,
the insulator material is formed in a layer on a surface of a body of the semiconductor material and
a layer of conductive material is formed on the insulator layer,
the thickness of the insulator layer being at least partially determinative of the rate of response of the device.

16. A device as in claim 15 and in which,
the semiconductor material is p-type Si.

17. A device as in claim 16 and in which,
the insulator material is $SiO_2$.

18. A device as in claim 17 and in which,
the $SiO_2$ thickness is about 1000A°,
the conductive material is Al of thickness about 500A°, and
the electron beam directed into the given area during the other interval is of sufficient energy to penetrate through the Al and $SiO_2$ layers and into the Si.

19. A device as in claim 11 and in which,
the stored and detected signals are binary,
the existence of stored positive electrical charge at the given area represents storage of one binary condition and
the lack of stored electrical charge at the given area represents the other binary condition.

20. A device as in claim 19 and in which,
the semiconductor material is p-type and
said transient signal produced during said other interval is substantially larger when a binary one is stored at the given area than when a binary zero is stored at the given area.

21. A device as in claim 19 and in which,
the semiconductor material is n-type and
said transient signal produced during said other interval is substantially smaller when a binary one is stored at the given area than when a binary zero is stored at the given area.

22. A device as in claim 19 and in which,
a controlled electric field is applied across said interface during the other interval.

23. A device as in claim 20 and in which,
a controlled electric field is applied across said interface during the other interval, and
the direction of said field being from the insulator material toward the semiconductor material.

24. A device as in claim 21 and in which,
a controlled electric field is applied across said interface during the other interval, and
the direction of said field being from the semiconductor material toward the insulator material.

25. A device as in claim 11 and in which,
the semiconductor and insulator materials are sandwiched between electrically conductive layers and said detecting means is coupled to one of said conductive layers.

26. A device as in claim 25 further including,
a cathode ray tube,
the sandwich is the target in the cathode ray tube and the electron beam is produced in the cathode ray tube,
means are provided for directing the beam to different areas of the sandwich lying in the plane of the interface, and
means are provided for energizing the beam,
whereby said electrical charge is selectively stored at different areas and said detected signal produced when the beam is directed to a selected area is representative of said selectivity.

27. A device as in claim 26 and in which,
the stored and detected signals signify binary values,
the existence of stored electrical charge at a given area represents storage of one binary condition at that area and
the lack of stored electrical charge at a given area represents storage of the other binary condition at that area.

28. A device as in claim 26 and including
means for synchronizing the controlled electric field and the beam to store a charge pattern in the plane of the sandwich and to detect the stored charge pattern or any part thereof.

29. A device as in claim 27 and including
means for controlling the electric field when the binary condition of storage at a given area is detected to restore the said condition.

30. A computer memory element for storing binary data in the form of electric charge patterns comprising,
a conductive back layer,
a semiconductor layer,
an insulator layer, and
a conductive front layer arranged in the order named in the form of a sandwich with the semiconductor layer and insulator layer forming an interface,
the conductive back layer covering substantially the entire surface of the semiconductor layer opposite the interface,
the conductive front layer covering substantially the entire surface of the insulator layer opposite the interface,
signal detecting means coupled to at least one of said conductive layers,
means for generating and directing a write electron beam into given areas of the insulator layer in the presence of an electric field across the sandwich, reversibly changing stored electric charge in said given areas and producing a change in a depletion region in the semiconductor layer adjacent the interface in registration with the stored charge, said depletion region being representative of the binary data, and means for generating and directing a read electron beam into the depletion region producing a transient pulse signal to the detecting means representative of said stored binary data.

31. A memory element according to claim 30 further including, terminal lead means for respective electrical connection of a source of electric energy across the conductive back layer and the conductive front layer, thereby producing an electric field across substantially the entire cross section of the sandwich.

32. A memory element according to claim 30 wherein, the conductive front layer and insulating layer have thicknesses and are constituted in a manner such that the combined layers can be penetrated by an electron beam of moderate energy level.

33. A memory element according to claim 30 wherein, the impingement of the read electron beam into the depletion region of the semiconductor layer adjacent the given charge areas of the insulator layer produces electron-hole pairs which are separated and swept from the region by the electric field associated with the depletion region producing said transient pulse signal as a transient current pulse which is representative of the stored charge.

34. A memory element according to claim 33 wherein, the semiconductor material is p-type silicon.

35. A memory element according to claim 34 wherein, the insulator material is silicon dioxide ($SiO_2$).

36. A memory element according to claim 35 wherein, the front conductive layer is aluminum having thickness of about 500 angstrom units (500 A°).

37. A memory element according to claim 36 wherein, the silicon dioxide ($SiO_2$) layer has a thickness of about 1000 angstrom units (1000 A°) and the combined conductive front layer and insulating layer are capable of being penetrated by an electron beam of moderate energy level.

38. A system for storing binary information comprising, cathode ray tube, a sandwich of contiguous layers of electrical semiconductor, insulator and conductor materials, in that order, at the target of the tube, an output circuit electrically coupled to the sandwich, circuits for controlling the position and intensity of the electron beam in the tube, means for causing electrical charge to be reversibly stored at discrete points in the plane of the sandwich in the insulator layer, said stored electrical charge producing a space charge region in the semiconductor material adjacent the interface between the semiconductor and insulator materials and means for directing the electron beam into the space charge region exciting electrons into the semiconductor conduction band and producing holes in the semiconductor valence band which are swept from the region by the electric field associated with the space charge region producing a transient current pulse which is conducted to the output circuit.

39. A system as in claim 38 and in which, means are provided for producing a controlled electric field in the sandwich of materials directed across said interface and the controlled field is synchronized with the electron beam.

40. A device as in claim 1 and in which, the space charge region in the semiconductor is a depletion region when the transient signal is detected.

41. A device as in claim 40 and in which, the transient signal is a current peak which is detected when the beam is directed to the depletion region.

42. A device as in claim 1 and in which, the semiconductor material is n-type, said stored electric charge is changed negative producing a depletion space charge region in the semiconductor material adjacent the interface and the electron beam is directed into the depletion region exciting electrons into the semiconductor conduction band and producing holes in the semiconductor valence band which are swept from the region by the electric field associated with the depletion region producing a transient current pulse which is conducted to the signal detecting means.

43. A system as in claim 38 and in which the space charge region is a depletion region.

44. A system for storing binary information comprising, a cathode ray tube, a sandwich of contiguous layers of electrical semiconductor, insulator and conductor materials, in that order, at the target of the tube, an output circuit electrically coupled to the sandwich, circuits for controlling the position and intensity of the electron beam in the tube, an input circuit electrically coupled to the beam control circuits, a source of input signals, means for directing the electron beam to the sandwich during a write-in interval to reversibly store electrical charge at discrete points in the plane of the sandwich in the insulator layer in response to the input signals applied to the input circuit, said stored electrical charge producing a space charge region in the semiconductor material adjacent the interface between the semiconductor and insulator materials and means for directing the electron beam into the space charge region during a read-out interval exciting electrons into the semiconductor conduction band and producing holes in the semiconductor valence band which are swept from the region by the electric field associated with the depletion region producing a transient current pulse which is conducted to the output circuit during a read-out interval in representation of said stored charge.

45. A system as in claim 43 and in which, the input signals are of two kinds, the write-in and the read-out, the write-in input signals determine the pattern of storage points in the plane of the sandwich and the read-out input signals determine the points in the sandwich to which the beam is directed to produce the representative transient signals in the output circuit.

46. A system as in claim 44 and in which, the write-in and the read-out input signals are effective at different intervals defined as the write-in and the read-out intervals, respectively.

* * * * *